United States Patent [19]

Davis, deceased et al.

[11] 3,940,464

[45] Feb. 24, 1976

[54] PRODUCTION OF LACES AND GRANULES OF FIBRE-REINFORCED THERMOPLASTICS

[75] Inventors: John Howard Davis, deceased, late of Bengeo, England; Richard C. Harwood, executor, Chalfont St. Giles; Barbara Davis, executrix, Hertford, both of England

[73] Assignee: Imperial Chemical Industries Limited, London, England

[22] Filed: Sept. 27, 1974

[21] Appl. No.: 510,136

[30] Foreign Application Priority Data

Oct. 9, 1973 United Kingdom............... 47077/73

[52] U.S. Cl. ............ 264/40; 264/DIG. 51; 264/136; 264/137; 264/140
[51] Int. Cl.² .......................................... B29D 9/08
[58] Field of Search .... 264/134, 137, 136, DIG. 51, 264/40, 140; 156/167

[56] References Cited

UNITED STATES PATENTS

| | | | |
|---|---|---|---|
| 3,068,516 | 12/1962 | Hofer | 264/134 X |
| 3,274,308 | 9/1966 | Freeman | 264/40 |
| 3,586,560 | 6/1971 | Stranch | 156/167 |
| 3,703,396 | 11/1972 | Lamanche | 264/137 X |
| 3,742,106 | 6/1973 | Price | 264/134 X |
| 3,758,329 | 9/1973 | Garick | 156/167 X |

*Primary Examiner*—Richard R. Kucia
*Attorney, Agent, or Firm*—Cushman, Darby & Cushman

[57] ABSTRACT

A method of producing fibre-reinforced thermoplastic materials in which a plurality of rovings are impregnated with a powdered thermoplastic, the thermoplastic is melted and each impregnated roving is consolidated by passing it through a die which includes the step of contacting all the rovings with a common pool of molten polymer.

6 Claims, 8 Drawing Figures

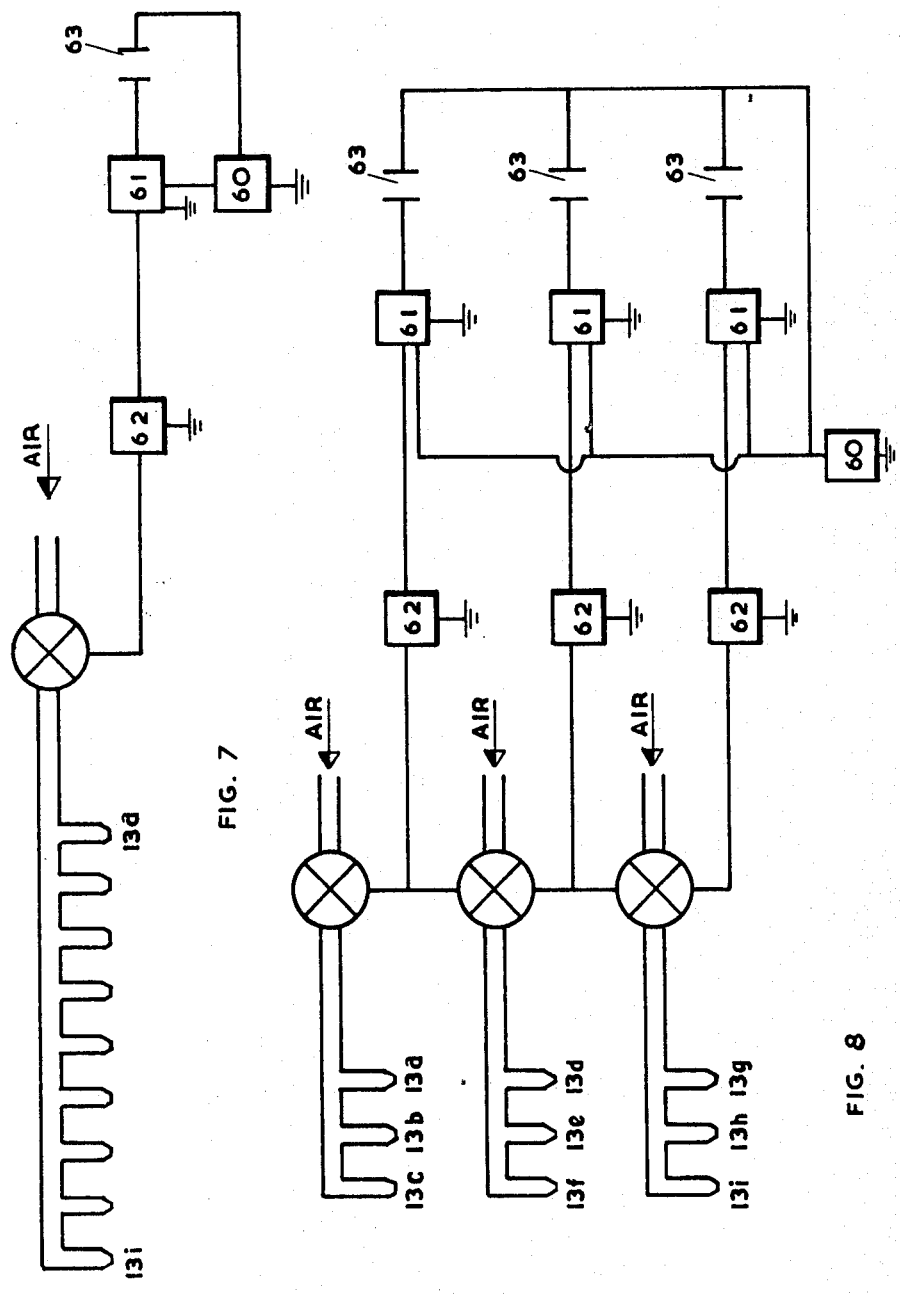

PRODUCTION OF LACES AND GRANULES OF FIBRE-REINFORCED THERMOPLASTICS

The invention relates to the production of laces and granules of fibre-reinforced thermoplastic polymers.

It has recently been proposed to produce laces (and, by chopping the lace, granules) of fibre-reinforced thermoplastic polymers by impregnating a roving with a powdered thermoplastic polymer, heating the impregnated roving to melt the polymer and passing the heated roving through a die to consolidate the product. A process of this nature has been described in our U.K. Pat. Specification No. 1 334 702.

The invention relates to a modified form of this process.

According to this invention a method for the simultaneous production of a plurality of laces of fibre-reinforced thermoplastic polymers comprises:
a. impregnating each of a plurality of rovings with a powdered thermoplastic polymer;
b. heating each impregnated roving in a separate chamber so as to melt the polymer which it contains;
c. heating, before or after the heating specified in (b), all the rovings in a common chamber and in contact with a common pool of molten polymer, and
d. passing each roving through its own separate die to consolidate the roving into a lace with the removal of excess polymer into the melt pool.

Step (a) is conveniently carried out as described in U.K. Pat. No. 1 334 702 i.e. by drawing the roving under-and-over a series of bars, optionally with threads, immersed in a fluidised bed of the polymer.

As proposed in our copending U.K. Pat. Application No. 26983/73, it is preferable to control the size of the melt pool. Thus, in a preferred embodiment of the invention, the presence or absence of the common melt pool is detected by one suitably placed detector which, or a plurality of suitably placed detectors each of which, controls the impregnation of one or more rovings in such a manner that the amount of impregnation is higher when "absence" is detected than when "presence" is detected. Most suitably the quantity of the polymer passing into each controlled roving is reduced by directing an air jet at it when appropriate.

The arrangement of control elements depends on the evenness of the melt pool. When the pool is sufficiently even the preferred arrangement comprises a single detector which controls the impregnation of all the rovings. This arrangement controls the size of the pool but there is no control over the distribution; the pool will even itself if its viscosity is appropriate.

When the pool does not distribute itself evenly enough it is preferred to use a plurality of detectors each of which controls the impregnation of several adjacent rovings. With this arrangement each detector is concerned with a segment of melt pool and an excessive segment can be depleted at the same time that a deficient segment is replenished. In its extreme form this arrangement comprises a detector for each roving wherein each detector controls the impregnation of its own roving.

The detectors are most suitably capacitances connected into suitable trigger circuits. Details of constructions and circuits are given in our copending Application No. 26983/73.

The laces produced as described above can be cut into granules by conventional techniques. This cutting is improved by applying a coating to the lace after it has been formed in the die. A method of applying these is described in our copending U.K. Application No. 39411/72.

The present invention can be used to make granules by chopping the lace. The preferred method of making granules comprises:
(e) passing all the laces from (d) above, while their temperatures are still high enough for their surfaces to be tacky, above the surface of a bath of a powdered thermoplastic composition while a current of air is directed at each lace from below the surface of the bath whereby powder from the bath is caused to adhere to the surface of each lace;
f. passing all the laces into a common heating zone and heating all the granular coatings applied in (e) in contact with a common pool of molten polymer so that each coating melts;
g. passing each roving with its molten coating through a separate die so that each coating becomes more uniform; and
h. cooling the lace from (g) and cutting it into granules.

It is desirable to control the size of the melt pool in (f); this can be achieved in a similar manner to the control of the melt pool in (c).

In one embodiment of the invention advantages are obtained when the die for consolidating the roving into a lace is separated from the chamber in which the impregnated roving is heated to melt the polymer. The excess polymer removed by the die from the impregnated roving may be controlled to form a small melt pool at the die. The major advantage which accrues is that the tension in the roving is considerably reduced. In a typical experiment in which a glass-reinforced polypropylene lace was produced the tension in the roving was reduced by a factor of 5 when the die was separated from a heated tube for melting the polymer of the impregnated roving compared with the case when the die was situated at the end of the heated tube. As a consequence of the reduced tension not only is the risk of breakage of the roving and loss in production reduced but the output of the unit may be increased by increasing the haul-off rate of the roving. A further advantage of the reduced tension in the roving is that wear in the equipment, particularly the haul-off machinery is noticeably reduced.

The invention will be further described by way of example, with reference to the accompanying diagrammatic drawings in which:

FIGS. 7 and 8 are circuit diagrams of control systems.

Figure 1:
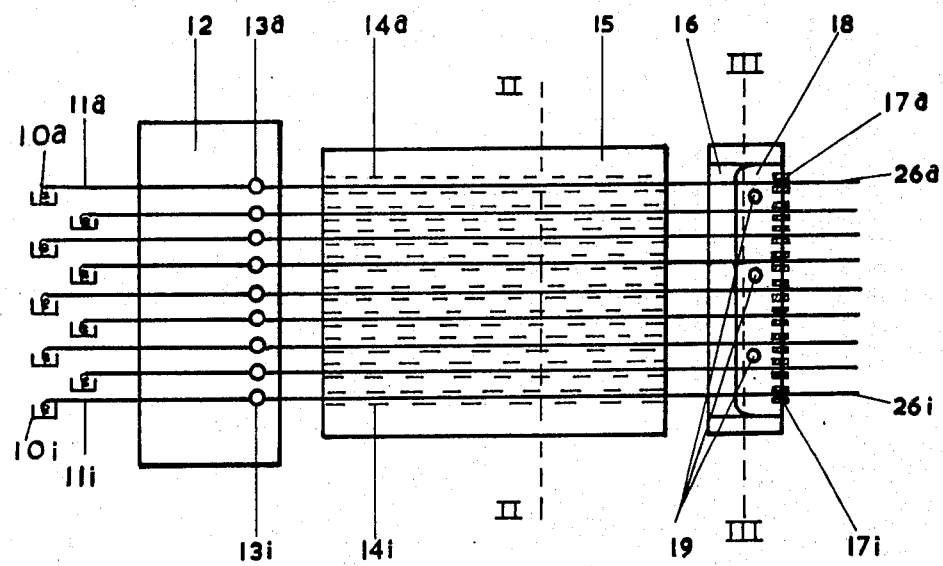
FIG. 1 is a plan view of equipment for making laces in accordance with the invention.
Figure 4:
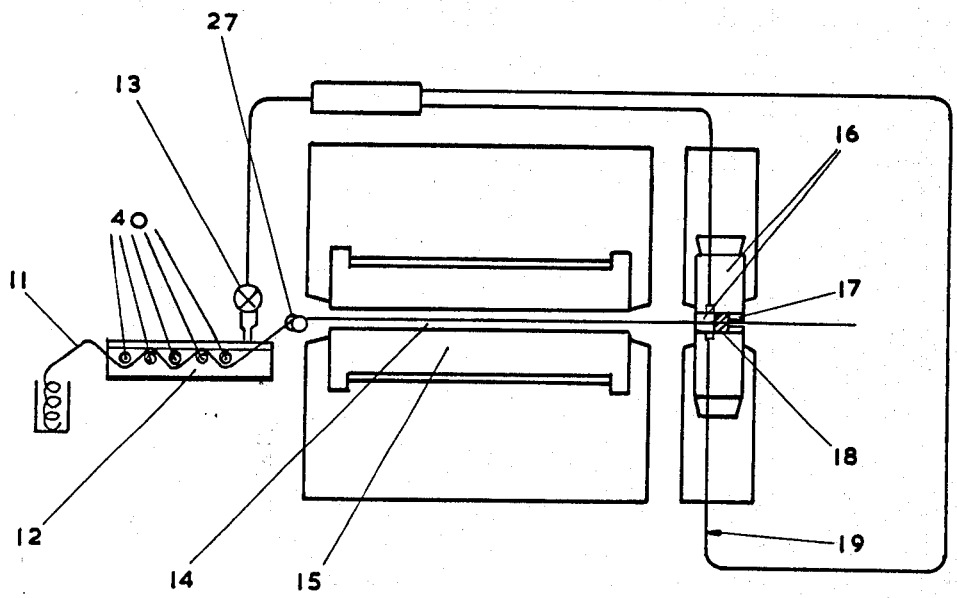
FIG. 4 is a longitudinal section along the path of any one of the rovings.

The process illustrated in FIG. 1 produces nine fibre-reinforced polypropylene laces from nine bobbins 10a to 10i of glass rovings. The rovings 11a to 11i pass into a fluidised bed 12 containing polypropylene (where they pass under-and-over bars as shown in FIG. 4). As they pass through the bed 12 the rovings become impregnated with (an excess of) polypropylene and on leaving each passes one of the nozzles 13a to 13i which intermittently blow air at the rovings. The blast depletes the outer layers of the rovings so that the excess becomes a deficiency and hence control of the jets (as described below) enables the average input of polypropylene to be adjusted to requirements.

Figure 2:
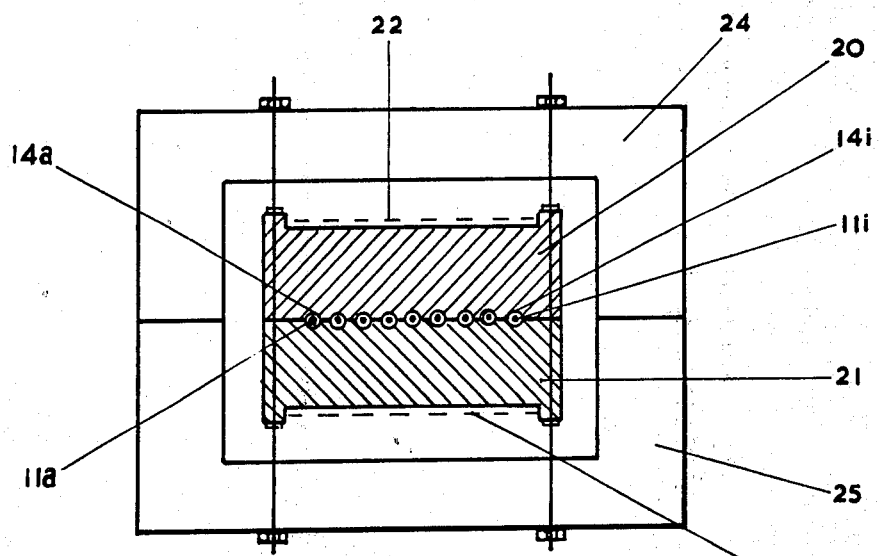
FIG. 2 is a cross-section on the line II—II of FIG. 1.

After impregnation each roving enters one of nine hot tubes 14a to 14i. The tubes are mounted in a heated block 15 (as shown in FIG. 2). The rovings pass from the hot tubes 14a to 14i via a small gap into a heated common chamber 16 (shown in cross-section in FIG. 3). The common chamber has dies 17a to 17i and each roving passes through its own die to become a lace, i.e. roving 11a passes through die 17a to become lace 26a, roving 11b passes through die 17b to become lace 26b and so on.

Figure 3:
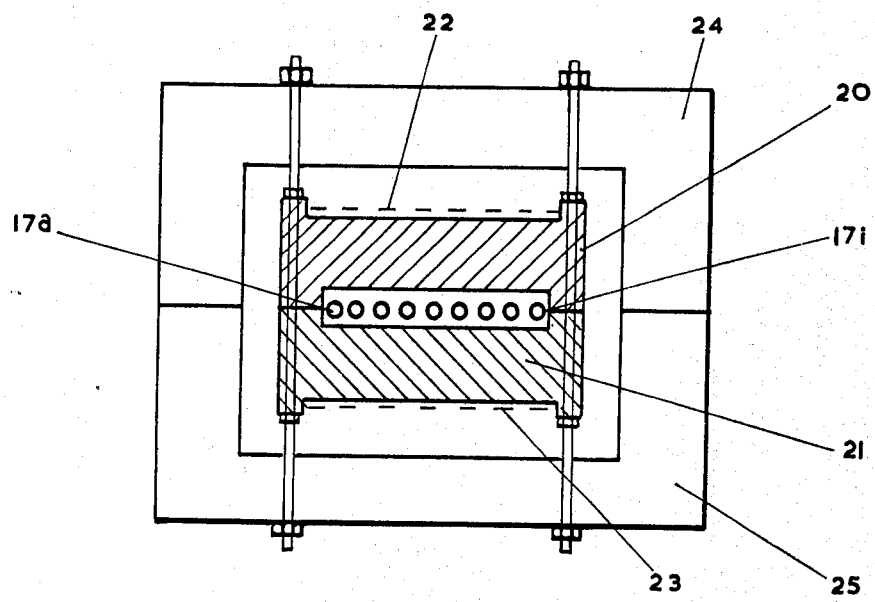
FIG. 3 is a cross-section on the line III—III of FIG. 1.

As shown in FIG. 2 the heated block 15 comprises upper and lower halves 20 and 21 having electrical heaters 22 and 23 with thermostats not shown in any drawing; all of these components are enclosed in insulation 24, 25. Each of the halves 20 and 21 has grooves and the tubes 14a to 14i fit into the grooves, a cement being used to give good thermal contact. The space between the tubes is about the same as their external diameters. This gives efficient heat transfer and a compact arrangement. The bore of each tube is about twice the cross-sectional area of an impregnated roving. FIG. 3 shows that the arrangement for the common chamber 16 is similar to the arrangement shown in FIG. 2.

FIG. 4 is a section along one of the laces; since it applies to all the rovings the affixes *a* to *i* will not be used. FIG. 4 shows the arrangement of five bars 40 inside the fluidised bed of polypropylene. The roving 11 passes under-and-over these bars, i.e. under the first and under the last, as it leaves the bed the roving passes by the nozzle 13 which is positioned to blow polypropylene off the surface of the roving 11 back into the bed 12.

The operation of the process is as follows. As the roving 11 passes under-and-over the bars 40 its filaments are spread out and powdered polypropylene therefore enters between the filaments. As the roving reforms, i.e. as it comes out of the bed, more powder becomes trapped between the strands so that an impregnated roving is achieved. (Note: This impregnation is the same as that described in our U.K. Pat. No. 1 334 702.)

As already stated the roving 11 passes a nozzle 13 which depletes the outer layers of the roving when the air supply is on and it enters the hot tube 14 wherein the polypropylene melts. The roving conveys the molten polypropylene into the common chamber 16 and finally the roving passes through the die 17 which consolidates it into a lace 26.

Any excess polypropylene is removed by the die and it passes into a melt pool 18 which therefore grows until it fills the chamber 16 as far as the detector 19.

The presence of the melt pool 18 at the detector 19 causes the air supply to the nozzle 13 to switch "on" and deplete the surface layers of the impregnated roving. The deficiency is made good at the expense of the melt pool 18 which grows smaller until the absence of melt pool at the detector 19 causes the air to switch "off". Thus a control cycle which maintains a melt pool 18 of substantially constant size is established.

Further description of the treatment of the lace 11 after the die 17 and also of the control system are given below.

Figure 5:
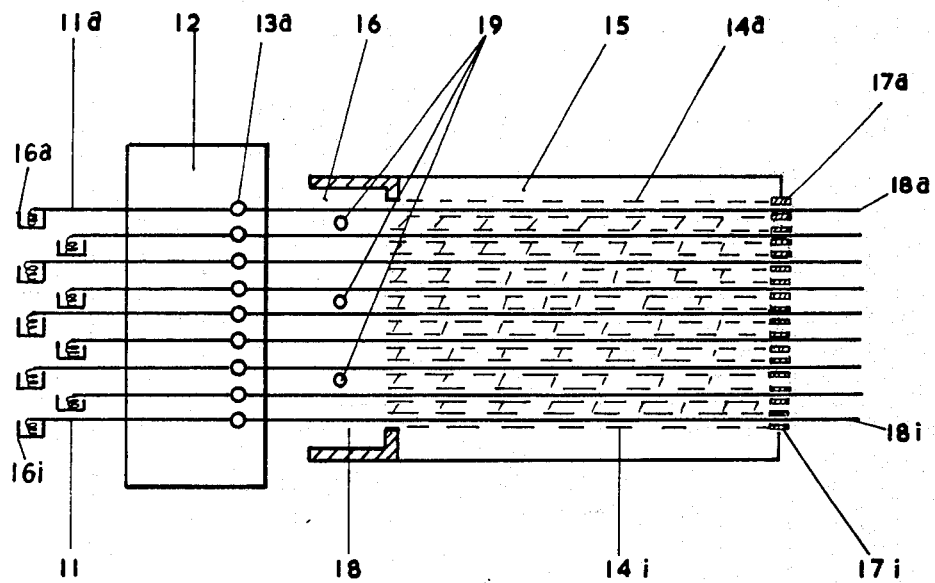
FIG. 5 is a plan view of a second embodiment.

A modified version of the system is shown in FIG. 5. The only important difference between FIGS. 1 and 5 is that, in FIG. 5, the common chamber 16 is before the hot tubes 14a to 14i instead of after. Thus the tubes 14a to 14i fit into the chamber 16 in place of the dies in FIG. 1; the dies 17a to 17i are fitted at the ends of the tubes. The detector 19 is at the up-stream ends of the tubes. In operation this means that the tubes 14a to 14i are full of molten polymer. This has the relative advantage (compared with FIG. 1) that the molten polymer in the tubes acts as a better heat transfer medium than air in assisting the transfer of heat to the rovings. It has the relative disadvantage that the volume of molten polymer is slightly increased and hence thermal degradation is slightly increased (but even in FIG. 5 thermal degradation is not high enough to matter).

The laces produced as described above are coated and cut as shown in FIG. 6.

The (hot) laces 26a to 26i from the dies 17a to 17i (of either FIG. 1 or FIG. 5) pass over a fluidised bed 44 of polypropylene. As they pass over the bed 44 they pass through curtains of polymer particles carried in streams of air, i.e. they pass through a permanent curtain 42 and an intermittent curtain 43. These polymer curtains are produced by blowing air at the laces 26a to 26i from below the surface of the bed. Thus particles of polypropylene are carried up and these stick to the laces; the polymer curtain 42 produces a coating which is augmented by the polymer curtain 43. The coated laces pass into a second common chamber 47 (which is very similar to chamber 16 of FIG. 1). The detector 46 controls the air supply to the curtain 43; when the melt pool 45 is too large the air supply is off so that the melt pool 45 becomes smaller.

On leaving the dies 41a to 41i the laces are cooled in a water bath 48, pass through haul-off rollers 49 and into conventional cutters 50 where they are cut into granules.

The basic control system is shown, as a block diagram, in FIG. 7. It comprises a signal generator 60 connected via a capacitor 63 to a measuring circuit 61 which is balanced to give zero output when there is no polypropylene in the capacitor 63.

Figure 6:
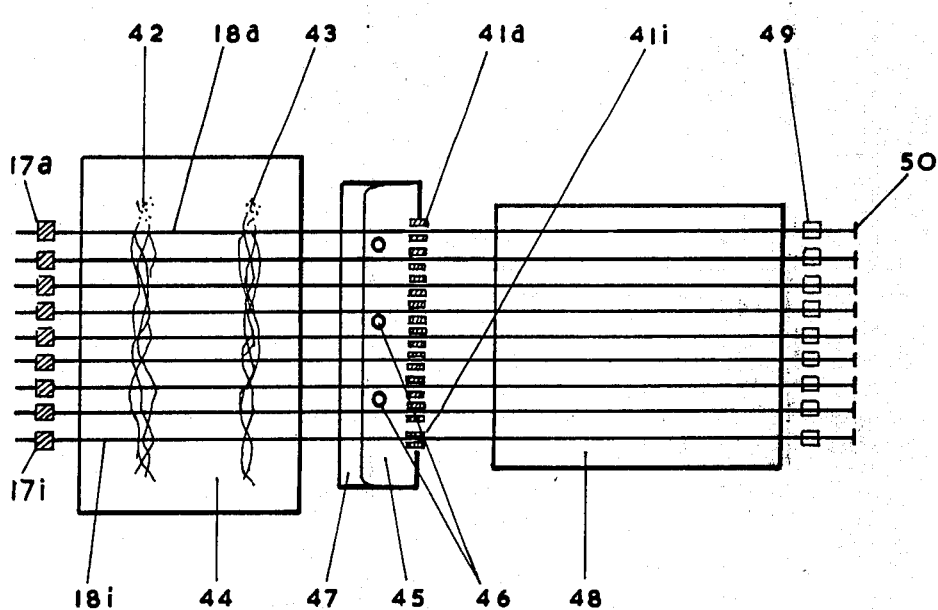
FIG. 6 is a plan view showing the coating of the laces and the cutting into granules.

The capacitor 63 is the detector mentioned above, it is indicated by 19 in FIG. 1, by 19 in FIG. 5 and by 46 in FIG. 6. It is formed of a pair of probes each having a central electrode mounted in and insulated from an earthed case.

The presence of polypropylene as dielectric in the capacitor 63 unbalances the circuit 61 and causes a signal to pass to trigger 62 which gives a power output to sensitise electromagnetic valves which control the supply of air to the nozzles 13a to 13i (or to switch off the air to the curtain 43).

FIG. 7 illustrates a circuit for a single detector which is situated near lace *e* at the position indicated by 19 in FIG. 1, by 19 in FIG. 5 or by 46 in FIG. 6.

FIG. 8 illustrates a circuit for three detectors which are situated near laces *b*, *e* and *h* at the positions indicated by 19 in FIG. 1, by 19 in FIG. 5 or by 46 in FIG. 6.

I claim:

1. A method for the simultaneous production of a plurality of laces of fibre-reinforced thermoplastic polymers which comprises:

a. impregnating each of a plurality of rovings with a powdered thermoplastic polymer by applying an amount of the powder to the roving;
b. heating each impregnated roving in a separate chamber so as to melt the polymer which it contains;
c. heating, before or after the heating specified in (b), all the rovings in a common chamber and in contact with a common pool of molten polymer,
d. passing each roving through its own separate die to consolidate the roving into a lace with the removal of excess polymer into the melt pool, and
e. controlling the size of the melt pool by detecting the extent of the pool with at least one suitably placed detector and by correspondingly adjusting the amount of powdered thermoplastic polymer applied to the roving in response to changes in the extent of the melt pool whereby a lace of uniform composition is produced.

2. A method for the production of granules of fibre-reinforced thermoplastics comprising applying an amount of powdered thermoplastic composition to the fibre-reinforced laces formed according to claim 1, by passing the laces at a temperature high enough for the surface of the lace to be tacky, above the surface of a bath of powdered thermoplastic composition while a current of air is directed at each lace from below the surface of the bath whereby powder from the bath is caused to adhere to the surface of each lace, passing all the laces so treated into a common heating zone and heating all the powder coatings applied in contact with a common pool of molten polymer so that each coating melts, passing each roving with its molten coating through a separate die so that each coating becomes more uniform and excess polymer is removed into the melt pool, controlling the size of the melt pool by detecting the extent of the melt pool with at least one suitably placed detector and correspondingly adjusting the amount of powdered thermoplastic composition applied to the laces in response to changes in the extent of the melt pool whereby a lace of uniform composition is produced, cooling the coated lace so obtained and cutting it into granules.

3. A method according to claim 1 in which the size of segments of the melt pool are each controlled by a single detector.

4. A method according to claim 1 in which the amount of powdered polymer to the lace is controlled by using an air jet to reduce or increase the supply of polymer powder.

5. A method according to claim 1 wherein the die for consolidating the roving after impregnation with polymer powder and subsequent melting of the powder is separated from the heating chamber for melting the powder.

6. A method according to claim 1 in which the roving is a glass roving.

* * * * *